March 4, 1947.  I. WOLFF ET AL  2,417,033
ALTIMETER
Original Filed Feb. 28, 1939
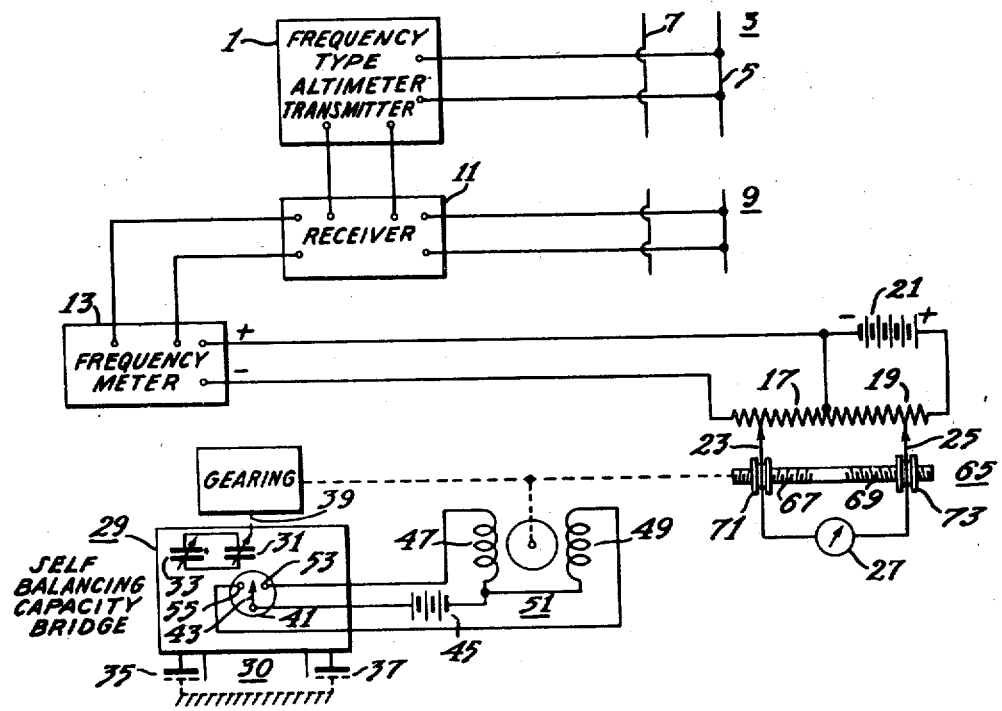
INVENTOR.
Irving Wolff &
Jarrett L. Hathaway
BY CD Puska
ATTORNEY Patented Mar. 4, 1947

2,417,033

UNITED STATES PATENT OFFICE 2,417,033

ALTIMETER

Irving Wolff, Princeton, N. J., and Jarrett L. Hathaway, Manhasset, N. Y., assignors to Radio Corporation of America, a corporation of Delaware Original application February 28, 1939, Serial No. 259,058. Divided and this application December 27, 1945, Serial No. 637,387

2 Claims. (Cl. 177—352)

This application is a division of our copending U. S. application, Serial No. 259,058, filed February 28, 1939, entitled "Altimeters" and assigned to the same assignee as the instant application.

This invention relates to aircraft altimeters in which high altitudes are determined by the time required to propagate radio frequency energy from such high altitude to the earth and back and in which low altitudes are determined by a change in an electrical network.

In the copending application of Jarrett L. Hathaway, Serial No. 259,066, filed February 28, 1939, entitled "Altimeter," a system has been disclosed for measuring altitude in which high altitudes are measured by the time required for pulses of radio frequency energy to be transmitted to the earth and back and in which the changes in the balance of an electrical bridge are used for determining lower altitudes. The indications of altitude are determined by peak voltmeter readings of an electrical timing wave which is suitably combined with the reflected pulses and energy from the electrical bridge.

The present invention represents an improvement of the Hathaway invention in that specific means are disclosed for combining the indications of a frequency type altimeter with the indications of a capacity bridge. The instant invention represents a further improvement by providing means which will not only indicate high and low altitudes but will differentially indicate the altitude with respect to a number of reflections. It is therefore one of the objects of this invention to disclose means whereby a frequency type altimeter for measuring higher altitudes may be combined with a capacity type altimeter for measuring lower altitudes. By the term "higher altitudes," distances of the order of from 100 feet and upward is meant; the term "lower altitudes" referring to distance determinations from approximately 200 feet to zero.

The invention will be described by reference to the accompanying drawing in which the single Figure 1 represents a schematic circuit of a frequency and capacity bridge type altimeter.

Referring to the drawing, the frequency modulated transmitter 1 of a frequency type altimeter is connected to an antenna array 3 which includes a radiator 5 and one or more reflectors 7 which are used to beam the radiations. A second, and preferably similar array 9, is connected to a radio receiver 11 which is also connected to the transmitter portion of the altimeter. The foregoing elements may be of the type disclosed in Bentley U. S. Patent No. 2,011,392. The output of the receiver is applied to a frequency meter 13 including a direct current output. The frequency meter may be of the type disclosed in Sanders U. S. Patent No. 2,228,367. The output is applied to a first potentiometer 17. The first potentiometer is connected to a second potentiometer 19 across whose terminals is connected a battery 21. Movable contacts 23, 25 of the first and second potentiometers are connected to a meter 27. Either of the potentiometer windings may be suitably tapered to obtain any predetermined variation of resistance per unit length. The slidable contacts are operated by means which will hereinafter be described.

A self-balancing capacity bridge 29 is arranged as follows: A capacitor 30, varying as a function of the altitude, and a variable capacitor 31, preferably shunted by a trimmer capacitor 33, form two arms of the bridge. In practice the capacitor 30 includes two antennas 35, 37 which are shielded from each other and are arranged at the wing tips of the airplane, whose altitude is being determined. A meter type relay 41 is connected to the bridge to be operated as a function of the bridge balance. The movable contact 43 of the relay 41 is connected through a battery or other suitable source of power 45 to the field windings 47, 49 of a reversible motor 51. The fixed contacts 53, 55 of the relay are connected to the remaining terminals of the field windings. The shaft 39 of the variable capacitor is connected, through a suitable gearing 57 to the armature 63 of the motor. A screw 65 which includes reversely threaded portions 67, 69 is also connected to the armature. The reversely threaded portions respectively engage carriages 71, 73 which are connected to the movable contacts 23, 25.

The operation of the foregoing arrangement is as follows: An ultra high frequency oscillatory current is frequency modulated in the transmitter portion 1 of the altimeter. The thus modulated currents establish directively radiated waves. The waves travel to the earth and are reflected back to the antenna. After reflection, the waves induce electromotive forces in the antenna 9. These forces are applied to the receiver 11 and may be amplified therein. During the interval required for the transmission and reflection of the wave the frequency is changing and, therefore, the outgoing radiations and the incoming reflections will be of a different frequency. The transmitter portion 1 and the receiver portion 11 are interconnected so that currents of the frequency of the transmitted wave may be combined with currents of the frequency of the reflected wave to form currents of a beat frequency.

By measuring this beat frequency, the distance traveled by the wave, and hence the altitude of the device, may be indicated. A preferred method of measuring beats is to use a counter type circuit such as shown in the Sanders patent cited above. The counter provides rectified currents which are applied to the potentiometer 17. Since the frequency of the beats or the counts increases with altitude, the average potential across the potentiometer 17 will increase with altitude and will be approximately proportional thereto. If the electrical bridge is balanced at an altitude of the order of 200 feet, an unvarying potential will be applied to the contact 25 by the battery 21. As the altitude increases, the capacity bridge will stay substantially balanced and the rectified currents applied to the first potentiometer 17 will be approximately proportional to the altitude. Thus the rectified or counter currents will be indicated by the meter 27 to indicate altitudes above about 200 feet.

As the altitude is diminished below approximately 100 feet, the currents from the frequency type altimeter will fluctuate and will no longer truly represent the altitude. But at this point the electrical bridge will become unbalanced only to be rebalanced by the operation of the balancing motor 51 upon the variable balancing capacitor 31. The balancing operation is arranged to move the slider 25 toward the junction of the first and second potentiometers. At the same time the slider 25 is moved the slider 23 is also moved toward the center. The motion of the slider 23 is introduced to eliminate the effect of the currents corresponding to the output of the frequency altimeter, which as explained is now unreliable, and to apply steady currents from the battery 21 to the potentiometer 19. At the extreme right of the slider 25 the altitudes of the order of 100 to 200 feet will be indicated. At the midposition of the slider 25 on the potentiometer 19, the potential will indicate approximately 50 feet. At the extreme left of the slider 25 the potential will be zero to indicate zero altitude. It should be understood that the constants of the bridge are adjusted so that this zero indication will correspond to zero altitude.

It should be understood that the characteristic curves of either type altimeter may be adjusted to obtain the desired response. The altimeter scale may be linear or hyperbolic. Various types of elements of the timing type of altimeter are well known to those skilled in the art and therefore do not require any detailed description. The invention is not predicated upon the use of any particular type of transmitter, receiver, electrical bridge, or indicator. For example, the receiver may be of the superheterodyne or radio frequency amplifier type; and the electrical bridge may be any one of the several known varieties, operating upon change of reactance, radiation resistance or the like. In like manner, the bridge may be balanced at the surface of the earth or at any predetermined altitude.

We claim as our invention:

1. An altimeter including a frequency type altimeter for measuring altitudes above a predetermined level, means for applying the output currents from said altimeter to a first potentiometer, a capacity bridge, means for self-balancing said bridge for measuring altitudes below said predetermined level, a second potentiometer including a current source, a connection between said potentiometers, a meter connected between the adjustable contacts on each of said potentiometers, means for adjusting said contacts to correspond to said self-balancing so that the currents from said first potentiometer indicate altitudes above said predetermined level and currents from said second potentiometer indicate altitudes below said predetermined level.

2. An altimeter including an altitude determining device in which high altitudes are determined as a function of timing, a second altitude determining device in which low altitudes are determined by a self-balancing device, an indicator, means operated by said high altitude determining device to apply to said indicator currents varying as a function of high altitudes, and a second means operated by said self-balancing device to apply to said indicator currents varying as a function of said low altitudes.

IRVING WOLFF.
JARRETT L. HATHAWAY.